United States Patent Office 3,444,788
Patented May 20, 1969

3,444,788
HYDRAULIC ANNULAR PISTON MOTORS
Franz Sneen, Topasgatan 40, Goteborg, Sweden
Filed Nov. 22, 1966, Ser. No. 596,275
Claims priority, application Sweden, Dec. 13, 1965,
16,096/65; Sept. 2, 1966, 11,829/66
Int. Cl. F01c *9/00;* F16j *1/00, 9/00*
U.S. Cl. 92—120                            4 Claims

ABSTRACT OF THE DISCLOSURE

An oscillatory piston driven fluid actuator in which a part annular piston is operable with a clearance in a corresponding channel or cylinder with the ends of the piston being provided with sealing means. When fluid pressure is supplied to the piston ends, the piston may be deformed thereby resulting in the sealing members being crushed against the channel wall. To avoid this problem, pads of antifriction material are provided immediately below the sealing members. If the piston and arm are separate interengaging components, a pad is disposed outside of the connection for serving as a pivot during the rocking movement which will occur in lieu of the deformation of the individual components.

In the actuators having a vertical shaft similar pads are provided at the underside of the piston.

---

The invention relates to improvements in hydraulic annular piston motors.

In hydraulic annular piston motors for high and especially very high pressures, difficulties have been encountered in making the annular piston or pistons slide easily in their passages. When the piston is rigidly bound to a radial arm that transmits its movements to a central axle and this arm is so stiff that it does not bend when acted upon by the pressure of the piston, the pressure acting on the loaded end of the piston will cause the piston to straighten out, so that the radially outer side of the piston will press hard against the outer side of the channel.

When the rigidity of the arm is so low that the arm is exposed to elastic bending, the loaded end of the piston will be applied with its outer side against the outer side of the passage and the unloaded end of the piston will be pressing hard with its inner side on the radially inner side of the passage.

If the arm engages only a recess in the piston it will, when its end is loaded, sway about a point located at the center of its outer side and bearing against the wall of the passage and otherwise behave as described above in the case of an elastically bent arm.

If the motor axle is vertical and mounted in conventional slide bearings the piston will be pressing with its underside against the underside of the passage.

All these pressure points, separately or in combination, will cause the piston to slide heavily in its passage.

The object of the present invention is to provide an arrangement for such annular piston motors which wholly overcomes this difficulty.

The arrangement according to the present invention includes a casing having a part annular channel therein, at least one part annular piston having a cross-sectional area slightly less than the cross-sectional area of the channel mounted in the channel, a shaft extending into the casing and serving as a pivot for the piston, a radial arm interconnecting the piston and shaft, a sealing member for each pressure loaded end of the piston cooperable with the wall of the channel, said piston having recesses in at least the outer sides thereof, and a slide pad of antifriction material located in each recess for slidably engaging with the outer wall of said channel for accommodating possible deformation of the piston and arm thereby preventing such deformations from crushing the sealing member against the walls of the channel.

According to a feature of the present invention, the annular piston is provided on its sides with slide linings of an antifriction material, such as Teflon, nylon, bronze or the like, which may have the form of rails, plates or pads and are adapted to bear slidably against the bounding walls of the passage (channel) and to absorb the stresses acting on the sides of the piston.

The invention will now be described with reference to the accompanying drawings, which show embodiments of the invention, but in no restrictive sense.

FORM OF EMBODIMENT I (FIGURES 1 AND 2)

Figure 1:
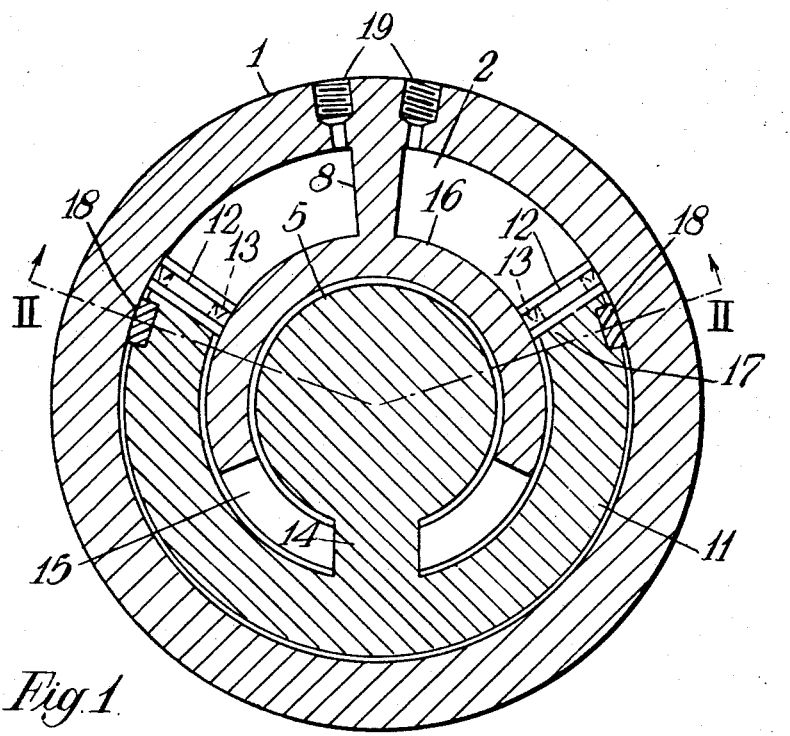
FIGURE 1 shows a form of embodiment of an annular piston motor according to the invention comprising a vertical axle, mounted in a conical roll bearing and a cylindrical slide bearing, and a fixed arm in section along the line I—I in FIGURE 2.
Figure 2:
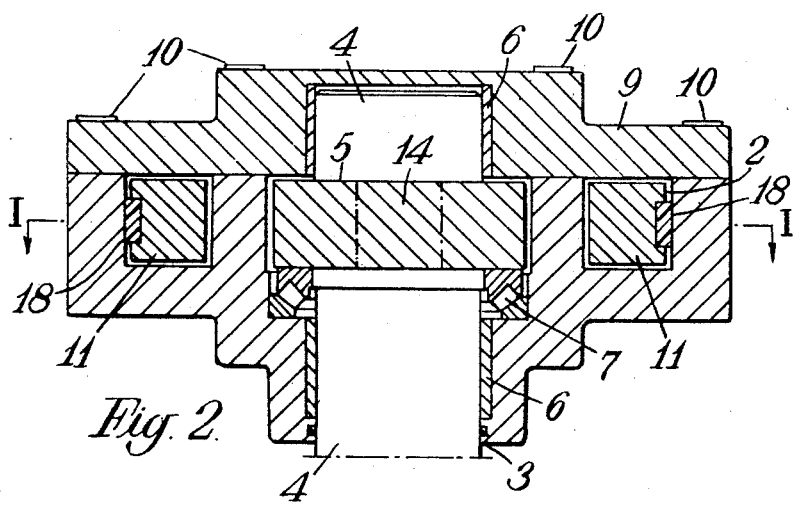
FIGURE 2 shows the same in section along the line II—II in FIGURE 1.

An annular piston motor is provided with a casing 1, which contains a circular annular channel 2 of rectangular cross-section and a central axle bore 3, wherein is mounted an axle 4 with a hub 5. The axle 4 is journalled in the axle bore 3 with cylindrical slide bearings 6, and the hub rests upon a conical roll bearing 7. The annular channel 2 is provided in one part with an interposed partition 8 and is covered by a cap 9, which is fixed over the casing by means of bolts 10 and adapted to lie sealingly against the partition 8. An annular piston 11 is mounted with play in the annular passage 2 and provided at its ends with seal holders 12 which support sealing sleeves 13. The seal holders 12 are mounted in a known way on flanged ends 17 of the piston to be movable, at least radially. The casing 1 is provided, within and on both sides of the partition 8, with ports 19 for the pressure fluids.

At its center the piston 11 is solidly joined to an arm 14, which is adapted to pass through a sector-shaped gap 15 in inner wall 16 of the annular passage 2 to the hub 5, with which it is solidly united. The piston 11 is provided on its radially outward side and near its end with slide pads or plates 18 of an antifriction material, such as Teflon, nylon, bronze or the like, with the plates or pads 18 being fitted into recesses provided for this purpose in the annular piston 11 and adapted to bear slidingly against the outer wall of the passage 2.

Owing to the arrangement according to the invention, it is possible to give the pistons 11 ample play, as slide pads etc. 18 ensure adequate slidability to the pistons 11 in the passage 2 without any fine finishing. Rough turning alone with under dimensioning by one or a few millimeters may often suffice. Satisfactory functioning may even be obtained without any machining at all, provided that the pistons 11 are cast with sufficient accuracy.

When one end of the piston 11 is loaded by pressure fluid this may cause a straightening stress on the loaded end of the piston 11. This stress, however, is absorbed by the slide plate 18 at this end.

FORM OF EMBODIMENT II (FIGURES 3 AND 4)

Figure 3:
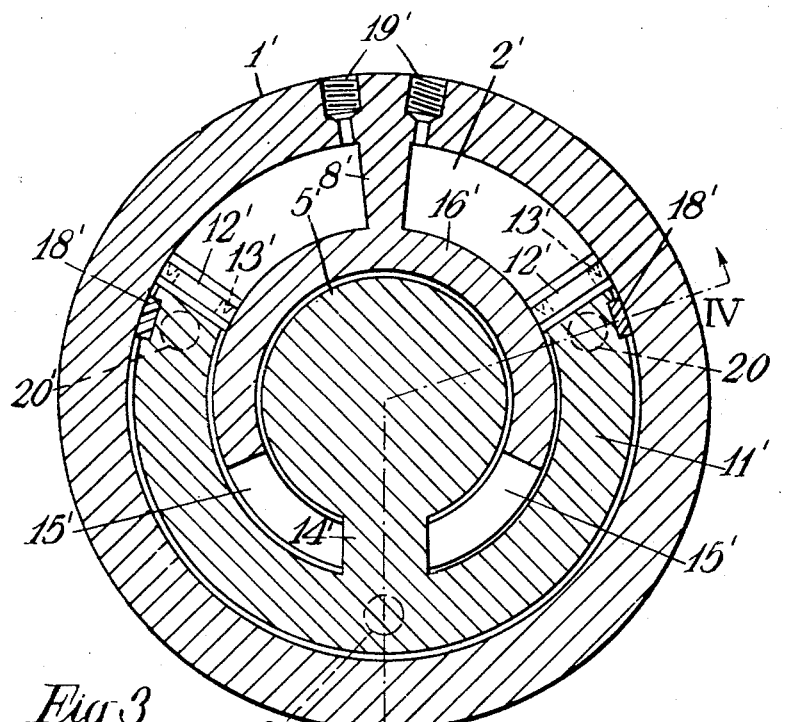
FIGURE 3 shows a form of embodiment of an annular piston motor according to the invention comprising a vertical axle, journalled in cylindrical slide bearings, and a fixed arm in section along the line III—III in FIGURE 4.
Figure 4:
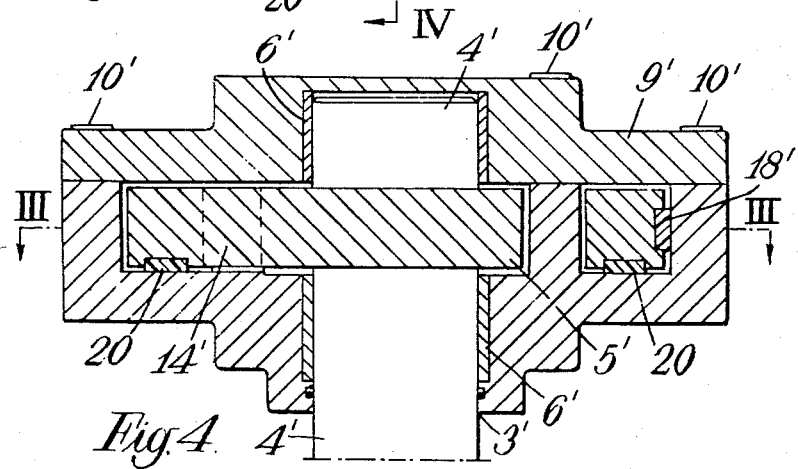
FIGURE 4 shows the same motor as FIGURE 3 in section along the line IV—IV in FIGURE 3.

This form of embodiment differs from Embodiment I in that the hub 5' is not supported by a conical roll bearing. Instead of this arrangement, the annular piston 11' is provided on its underside with slide pads 20 of antifriction material which are located at the two ends of the piston 11' and at the point where the arm 14' joins the piston illustrated in FIGURE 3. The said slide pads 20 are set in receses in the piston 11' and adapted slidingly to apply to the floor or base of the channel (passage) 2', as well as being so dimensioned as to be able to support the weight of the piston 11', arm 14', axle 4' and the superposed rotary members of the axle.

Figure 5:
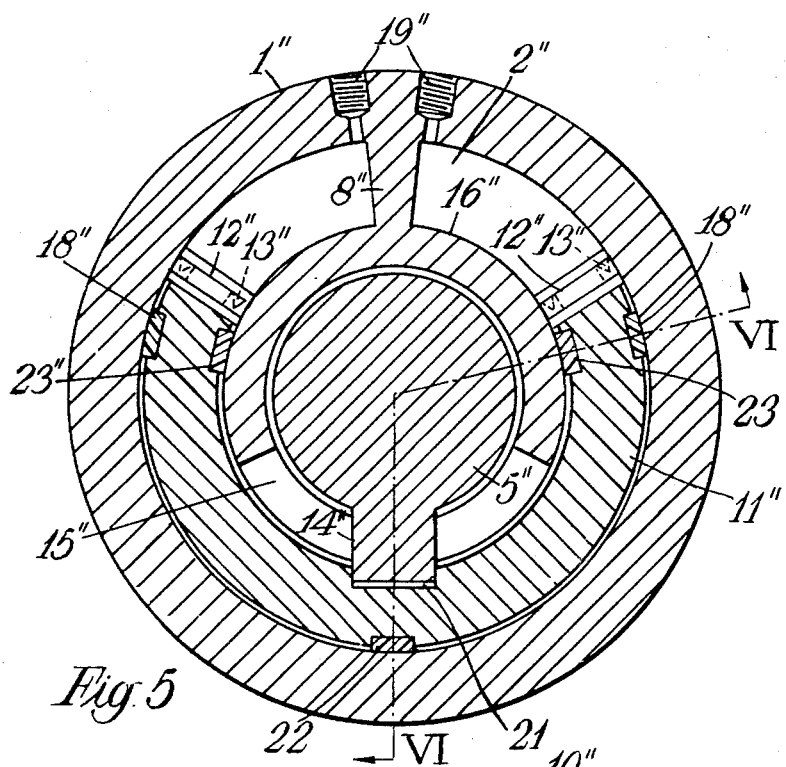
FIGURE 5 shows a form of embodiment of an annular piston motor according to the invention comprising a vertical axle, mounted in conical roll bearings and cylindrical slide bearings, and an arm engaging a recess in the piston in section along the line V—V in FIGURE 6.
Figure 6:
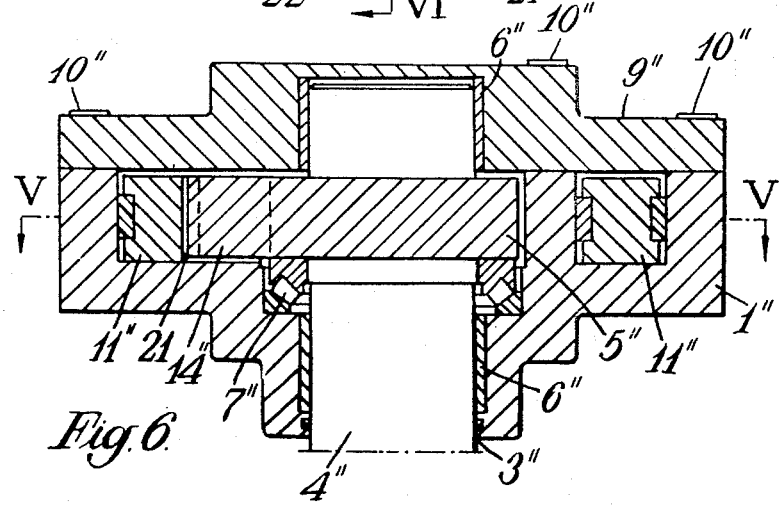
FIGURE 6 shows the same motor as FIGURE 5 in section along the line VI—VI in FIGURE 5.

FORM OF EMBODIMENT III (FIGURES 5 and 6)

This form of embodiment differs from Embodiment I in that the arm 14", instead of being rigidly bound to the piston 11", engages a suitable recess 21 on the inner side of the piston 11". Directly opposite in recess 21 the piston 11" is equipped with a plate 22 of antifriction material, adapted to bear slidingly against the outer side of the channel (passage) 2". In addition, the ends of the piston 11" are equipped with plates 23 of antifriction material located on their inner side.

If one end of the piston is loaded with fluid pressure, the outer slide plate 18" of this end and the slide plate 22 will be pressed against the outer side of the channel 2", while the inner slide plate 23 at the other end of the piston is pressed against the inner side of the channel 2" because the piston sways about the slide plate 22.

If desired, the piston may be also provided with bearing slide plates 20" on its underside, so that the conical roll bearing 7" becomes superfluous.

I claim:

1. In an oscillatory piston fluid driven actuator of the type including a casing having a part annular channel therein, at least one part annular piston having a cross-sectional area slightly less than the cross-sectional area of the channel mounted in the channel, a shaft extending into the casing and serving as a pivot for said at least one piston, a radial arm interconnecting said at least one piston and shaft, a sealing member for each pressure loaded end of said at least one piston cooperable with the walls of the channel, said piston having recesses in at least the outer side thereof, and a slide pad of antifriction material located in each recess for slidably engaging with the outer wall of said channel for accommodating possible deformations of said piston and arm thereby preventing such deformations from crushing the sealing member against the walls of the channel, said slide pads being located in proximity to said sealing members and being dimensioned for accommodating outward stresses arising from the deflection of the piston and arm.

2. The actuator as claimed in claim 1 in which the arm is solidly connected to the annular piston and a hub is rotatably fixed to the shaft.

3. The actuator as claimed in claim 1 in which said piston is provided with recesses in the inner sides thereof and a slide pad of antifriction material positioned in each recess slidably engages the inner wall of said channel for absorbing inwardly directed stresses arising from the swaying of said piston about its center.

4. In an oscillatory piston fluid driven actuator of the type including a casing having a part annular channel therein, at least one part annular piston having a cross-sectional area slightly less than the cross-sectional area of the channel mounted in the channel, a shaft extending into the casing and serving as a pivot for said at least one piston, a radial arm interconnecting said at least one piston and shaft, a sealing member for each pressure loaded end of said at least one piston cooperable with the walls of the channel, said piston having recesses in at least the outer sides thereof, and a slide pad of antifriction material located in each recess for slidably engaging with the outer wall of said channel for accommodating possible deformations of said piston and arm thereby preventing such deformations from crushing the sealing member against the walls of the channel, said arm being separate from the piston and engaging a recess in the radially inner side of said piston, and the piston on its outer side opposite said recess being provided with a slide pad of antifriction material engaging the outer wall of said channel and adapted to serve as a pivot for the rocking motion of the piston.

References Cited

UNITED STATES PATENTS

| 163,186 | 5/1875 | Hall | 92—120 X |
|---|---|---|---|
| 176,633 | 4/1876 | Holman | 103—145 |
| 374,968 | 12/1887 | Kadel | 92—120 X |
| 2,304,894 | 12/1942 | Dilworth | 92—123 |
| 2,649,077 | 8/1953 | Mehm | 92—120 |
| 3,053,236 | 9/1962 | Self et al. | 92—122 X |
| 3,155,015 | 11/1964 | Genz | 92—249 |
| 3,183,795 | 5/1965 | Kirk | 308—4 X |
| 3,188,919 | 6/1965 | Sills | 92—120 X |

MARTIN P. SCHWADRON, *Primary Examiner.*

IRWIN C. COHEN, *Assistant Examiner.*

U.S. Cl. X.R.

92—177, 248